United States Patent
Rawls

(10) Patent No.: US 10,161,436 B2
(45) Date of Patent: Dec. 25, 2018

(54) FASTENER INCLUDING ADHESIVE COMPOSITION AND METHOD OF MAKING THE SAME

(71) Applicant: ND Industries, Inc., Clawson, MI (US)

(72) Inventor: Norman M. Rawls, Sterling Heights, MI (US)

(73) Assignee: ND Industries, Inc., Clawson, MI (US)

( * ) Notice: Subject to any disclaimer, the term of this patent is extended or adjusted under 35 U.S.C. 154(b) by 482 days.

(21) Appl. No.: 14/830,733

(22) Filed: Aug. 20, 2015

(65) Prior Publication Data

US 2016/0053801 A1 Feb. 25, 2016

Related U.S. Application Data

(60) Provisional application No. 62/039,685, filed on Aug. 20, 2014.

(51) Int. Cl.
- *F16B 39/00* (2006.01)
- *F16B 39/22* (2006.01)
- *C09J 11/04* (2006.01)
- *F16B 33/00* (2006.01)

(52) U.S. Cl.
CPC .............. *F16B 39/225* (2013.01); *C09J 11/04* (2013.01); *F16B 33/004* (2013.01)

(58) Field of Classification Search
CPC .... F16B 13/142; F16B 33/004; F16B 33/008; F16B 39/00; F16B 39/34; F16B 39/225; C09J 11/04
USPC .................. 411/82, 82.2, 257, 258, 259, 914
See application file for complete search history.

(56) References Cited

U.S. PATENT DOCUMENTS

| | | | |
|---|---|---|---|
| 3,061,455 A * | 10/1962 | Anthony | F16B 33/06 156/281 |
| 3,146,142 A * | 8/1964 | Maly | F16B 33/06 156/289 |
| 3,485,132 A * | 12/1969 | Hanny | F16B 15/0092 29/458 |
| 3,642,937 A * | 2/1972 | Deckert et al. | C08G 59/188 260/DIG. 33 |
| 3,746,068 A * | 7/1973 | Deckert | F16B 33/06 411/258 |
| 4,081,012 A * | 3/1978 | Wallace | F16B 33/06 411/258 |
| 4,304,039 A * | 12/1981 | Asmus | F16B 19/02 29/505 |
| 4,657,460 A * | 4/1987 | Bien | F16B 33/004 411/258 |
| 5,000,636 A * | 3/1991 | Wallace | B05D 1/38 156/275.5 |
| 5,426,130 A | 6/1995 | Thurber et al. | |
| 5,651,824 A | 7/1997 | Wallace et al. | |
| 5,656,325 A | 8/1997 | Wallace | |
| 5,672,376 A | 9/1997 | Wallace | |
| 5,679,160 A | 10/1997 | Wallace et al. | |
| 5,928,711 A | 7/1999 | Wallace et al. | |
| 5,964,551 A | 10/1999 | Wallace | |
| 6,027,568 A | 2/2000 | Wallace et al. | |
| 6,270,838 B1 | 8/2001 | Wallace et al. | |
| 6,322,628 B1 | 11/2001 | Wallace | |
| 6,474,919 B2 | 11/2002 | Wallace et al. | |
| 6,613,452 B2 * | 9/2003 | Weir | C23C 28/023 148/527 |
| 6,817,816 B2 | 11/2004 | Hill | |
| 7,195,437 B2 * | 3/2007 | Sakamoto | F16B 33/06 411/258 |
| 7,404,483 B2 | 7/2008 | Wallace | |
| 7,521,402 B2 | 4/2009 | Combetta | |
| 7,771,148 B2 | 8/2010 | Phillips | |
| 7,772,316 B2 | 8/2010 | Barr | |
| 7,878,744 B2 | 2/2011 | Snow et al. | |
| 7,950,885 B2 * | 5/2011 | Rosenkranz | F16B 25/0026 411/258 |
| 8,865,794 B2 | 10/2014 | Wallace et al. | |
| 8,865,812 B2 | 10/2014 | Phillips | |
| 2003/0027955 A1 * | 2/2003 | Ishii | C08F 8/00 526/127 |
| 2004/0256978 A1 * | 12/2004 | Yu | H01L 51/5284 313/501 |
| 2005/0052119 A1 * | 3/2005 | Yu | H01L 51/5262 313/503 |
| 2005/0089384 A1 | 4/2005 | Pratt | |
| 2005/0100658 A1 * | 5/2005 | MacPherson | H01L 51/0004 427/58 |
| 2005/0181137 A1 | 8/2005 | Straus | |
| 2005/0230678 A1 * | 10/2005 | Cao | H01L 51/5203 257/40 |
| 2005/0236614 A1 * | 10/2005 | Parker | H01L 51/0003 257/40 |
| 2008/0292426 A1 | 11/2008 | Snow et al. | |
| 2009/0047092 A1 * | 2/2009 | Peffer | C09D 5/448 411/257 |

(Continued)

FOREIGN PATENT DOCUMENTS

| CA | 2632482 A1 | 11/2008 |
|---|---|---|
| EP | 0056269 A1 | 7/1982 |

(Continued)

*Primary Examiner* — Roberta S Delisle
(74) *Attorney, Agent, or Firm* — Warner Norcross & Judd LLP

(57) ABSTRACT

A fastener comprises a threaded surface and an adhesive composition at least partially disposed on the threaded surface. The adhesive composition includes an inorganic compound comprising at least one Group 1 metal and at least one Group 13 element and/or Group 14 element. The inorganic compound is present in an amount of at least about 20 parts by weight based on 100 parts by weight of the adhesive composition. A method of making the (coated) fastener comprises the steps of providing a fastener, providing the adhesive composition, and applying the adhesive composition to at least a portion of the threaded surface of the fastener. A method of joining adjacent elements comprises the steps of providing the adjacent elements, providing the fastener, and disposing the fastener adjacent and/or through the adjacent elements. An adhesive, formed by curing the adhesive composition, has excellent physical properties, including adhesive strength and high temperature resistance.

15 Claims, No Drawings

(56) References Cited

U.S. PATENT DOCUMENTS

| | | | |
|---|---|---|---|
| 2009/0255594 A1* | 10/2009 | Haller | B05C 5/001 137/565.11 |
| 2011/0135729 A1* | 6/2011 | Cheon | A61K 41/0052 424/484 |
| 2012/0083570 A1* | 4/2012 | Satrijo | C08K 3/10 524/561 |
| 2013/0195580 A1* | 8/2013 | Kast | F16B 33/008 411/387.4 |
| 2014/0199135 A1 | 7/2014 | Hable et al. | |
| 2015/0014126 A1 | 1/2015 | Snow | |
| 2015/0056394 A1 | 2/2015 | Rawls | |

FOREIGN PATENT DOCUMENTS

| | | |
|---|---|---|
| EP | 0440013 A2 | 8/1991 |
| EP | 1233043 A2 | 8/2002 |
| WO | WO99/66219 A1 | 12/1999 |
| WO | WO2008/073262 A1 | 6/2008 |
| WO | WO2008/094535 A1 | 8/2008 |
| WO | WO2008/094537 A2 | 8/2008 |
| WO | WO2008/153866 A1 | 12/2008 |
| WO | WO2008/153868 A1 | 12/2008 |

* cited by examiner

FASTENER INCLUDING ADHESIVE COMPOSITION AND METHOD OF MAKING THE SAME

CROSS-REFERENCE TO RELATED APPLICATIONS

This application claims priority to and all advantages of U.S. Patent Application No. 62/039,685 filed on 20 Aug. 2014, the content of which is hereby incorporated by reference.

FIELD OF THE INVENTION

The present invention generally relates to fastener, and, more specifically, to a coated fastener comprising an adhesive composition and to method of making the coated fastener. An adhesive formed by curing the adhesive composition of the coated fastener has excellent adhesive strength and resistance to high temperatures.

DESCRIPTION OF THE RELATED ART

Adhesive compositions and adhesives formed by curing adhesive compositions are known in the art and utilized in a variety of industries. For example, adhesives are commonly utilized to bond (or adhere) two adjacent layers or substrates to one another. There are a variety of different types of adhesives based on desired physical properties, the end use of the adhesive, and materials of the substrates to be joined.

One specific end use of adhesives is for coating fasteners, which are also utilized to mechanically join parts or elements. For example, fasteners may be self-locking, with self-locking functionality achieved through use of coatings that are applied to a surface of the fasteners. The coatings may be present as masking elements to prevent damage to or contamination fouling of the fastener prior to application. Such contamination may occur during certain coating and painting processes. Such coatings may also provide anti-seizing functions. In other cases, the coating may be utilized to enhance sealing between the fastener and an aperture in which the fastener is disposed to prevent intrusion of fluids, gasses or particulate matter in a cavity or to retain fluids or gasses within the cavity.

However, depending on an environment in which the fastener is utilized, conventional coatings readily deteriorate, particularly in high temperatures. For example, conventional polymeric coatings can thermally degrade or decompose when utilized for high temperature applications, e.g. in automotive and engine assemblies. Moreover, there are limitations and tradeoffs relative to desired physical properties of such conventional coatings.

BRIEF SUMMARY OF THE INVENTION

A fastener is disclosed. The fastener comprises a threaded surface and an adhesive composition at least partially disposed on the threaded surface. The adhesive composition includes an inorganic compound. The inorganic compound comprises at least one Group 1 metal. The inorganic compound further comprises at least one Group 13 element and/or Group 14 element. The inorganic compound is present in an amount of at least about 20 parts by weight based on 100 parts by weight of the adhesive composition.

A method of making the fastener of the present invention is also disclosed. The method comprises the steps of providing a fastener and providing the adhesive composition. The method further comprises the step of applying the adhesive composition to at least a portion of the threaded surface of the fastener.

The fastener of the present invention can be used to join adjacent elements. As such, a method of joining adjacent elements with the fastener is also disclosed. The method comprises the steps of providing the adjacent elements and providing the fastener. The method further comprises the step of disposing the fastener adjacent and/or through the adjacent elements. After disposing the fastener, the adhesive composition may be heated to initiate cure of the adhesive composition.

An adhesive is formed by curing the adhesive composition. The adhesive has excellent physical properties, including adhesive strength to a variety of substrates and high temperature resistance. The adhesive is useful for securely locking the fastener in place, such that the fastener is resistant to vibration and shock related slippage during use. The adhesive is also useful in applications/environments having temperatures well over 100° C. As such, the adhesive may also be referred to as "thread lock," "thread adhesive," "fastener adhesive," or "locking adhesive." The adhesive may also be useful for providing a seal against potential leakage of fluids and/or gasses.

DETAILED DESCRIPTION

A fastener, a method of making the fastener (i.e., "method of manufacture"), and a method of using the fastener (i.e., "method of use"), are disclosed herein. The fastener is described immediately below, followed by description of the method of manufacture and the method of use. That being said, it is to be appreciated that the fastener of the present invention is not limited to a particular method of manufacture or use.

Fastener

The fastener comprises a threaded surface. The fastener further comprises an adhesive composition at least partially disposed on the threaded surface. The fastener, while including the adhesive composition (or the resulting adhesive) disposed thereon, is generally referred to hereinafter as the "coated fastener." Moreover, the term "coated," is not to be construed as limiting the coated fastener in any way, such as by limiting the coated fastener to a particular configuration or method of manufacture. The fastener, while free of the adhesive composition (or the resulting adhesive), is generally referred to hereinafter as the "fastener."

By "at least partially disposed," it is generally meant that the adhesive composition is disposed on a portion, a majority, or an entirety, of the threaded surface of the coated fastener. Typically, the adhesive composition is disposed about the threaded surface of the fastener to coat the threaded surface thereof, although partial coating of the threaded surface may be carried out, e.g. circumferentially and/or lengthwise. The adhesive composition may also be present on non-threaded portions of the coated fastener, e.g. on an adjacent smooth surface (or surfaces).

As used herein, the term "adhesive composition," is generally used prior to initiating cure of the adhesive composition, and can refer to the adhesive composition while in either a liquid, wet or dry form. The term "adhesive," is generally used any time after cure of the adhesive composition is initiated, and need not refer to the adhesive in a final cure state. Cure of the adhesive is generally initiated after the coated fastener is put in place (or installed) for its end application.

The present invention is not limited to a particular type of fastener. Typically, the fastener is a conventional fastener understood in the art. Suitable fasteners include, but are not limited to, bolts, nuts, screws, studs, stand-offs, and combinations thereof. With bolts, screws, studs, and stand-offs, the fastener will generally have an elongated body which includes the threaded surface, and optionally, an adjacent smooth surface (or surfaces). The fastener may be of various types, drive types, head styles, diameters, and lengths. Combinations of different coated (or uncoated) fasteners may be utilized for a given end application, e.g. bolts and nuts, bolts and studs, bolts and screws, etc., or the coated fastener may be utilized alone, e.g. a coated bolt, a coated nut, etc.

The threaded surface may be external (i.e., male) or internal (i.e., female), and can be of various types, configurations, or patterns. As such, the threaded surface is not limited to, for example, a particular major diameter, minor diameter, pitch diameter, helix angle, thread angle, thread count, thread pitch, or number of crests/roots.

Average thickness of the adhesive composition on the coated fastener may be uniform or may vary. Typically, the adhesive composition fills at least a portion, a majority, or an entirety of the threaded surface roots. The adhesive composition may also cover at least a portion, a majority, or an entirety of the threaded surface crests. The total amount of adhesive composition utilized to coat the fastener is not limited and can be readily determined via routine experimentation for a given end application or need.

The fastener may be formed from conventional materials including, but not limited to, carbon steel, alloy steel, stainless steel ("SS"), plain steel ("PS"), iron, brass, bronze, titanium, aluminum, magnesium alloy, and combinations thereof. Typically, the fastener is formed from a metal or metal alloy to provide strength and rigidity.

The fastener may include various types of conventional plating and/or coating materials, including, but not limited to, zinc plating (e.g. galvanization, zinc flakes, etc.), chromium (or chrome) plating, nickel plating, cadmium plating, aluminum plating, magnesium coating, phosphate (e.g. dry phosphate) coating, and combinations thereof. Alternatively, the fastener may be a "virgin" or "bright" fastener (i.e., it may lack plating/coating). However, the fastener typically includes a conventional plating and/or coating material to prevent corrosion and/or aid in installation. The adhesive composition is generally disposed on or adjacent such plating and/or coating, which is typically already present on the fastener. Suitable fasteners for making the coated fasteners of the present invention are commercially available from a large number of suppliers.

The adhesive composition comprises an inorganic compound. It is to be appreciated that the inorganic compound may still comprise one or more carbon atoms despite being referred to herein as the "inorganic" compound. The inorganic compound is distinguished from "organic" compounds because the inorganic compound does not include a carbon backbone, is not derived from a hydrocarbon, and, if carbon is present therein, carbon is present only in certain ionic forms, e.g. in a carbonate ion. In certain embodiments, the inorganic compound is free from carbon. In other embodiments, the inorganic compound includes one or more carbon atoms provided that the number of carbon atoms is less than a total number of atoms other than carbon in the inorganic compound.

The inorganic compound comprises at least one Group 1 metal. The inorganic compound further comprises at least one Group 13 element and/or Group 14 element. In other words, the inorganic component comprises at least one Group 1 metal and Group 13 element, at least one Group 1 metal and Group 14 element, or at least one Group 1 metal, Group 13 element, and Group 14 element.

As understood in the art, Group 1 metals may also be referred to as Group I metals, Group IA metals, or alkali metals. The Group 1 metal of the inorganic compound is selected from the group consisting of lithium (Li), sodium (Na), potassium (K), rubidium (Rb), cesium (Cs), francium (Fr), and combinations thereof. In various embodiments, the Group 1 metal is selected from the group consisting of Li, Na, and K. In specific embodiments, the Group 1 metal is Na. As understood in the art, the Group 1 metal may be present in the inorganic compound as a cation.

In these embodiments, the inorganic compound typically comprises the Group 1 metal complexed with an oxide of the Group 13 and/or Group 14 element. As understood in the art, Group 13 elements may also be referred to as Group III elements, Group IIIA elements, Group IIIB elements, metalloids, or post-transition metals. Moreover, Group 14 elements may also be referred to as Group IV elements, Group IVA elements, Group IVB elements, polyatomic nonmetals, metalloids, or post-transition metals.

In various embodiments, the inorganic compound comprises at least one Group 13 element selected from the group consisting of boron (B), aluminum (Al), gallium (Ga), indium (In), thallium (Tl), ununtrium (Uut), and combinations thereof. In further embodiments, the inorganic compound comprises at least one Group 13 element selected from the group consisting of Al, Ga, In, Tl, Uut, and combinations thereof. In specific embodiments, the Group 13 element of the inorganic compound is Al.

In various embodiments, the inorganic compound comprises at least one Group 14 element selected from the group consisting of carbon (C), silicon (Si), germanium (Ge), tin (Sn), lead (Pb), flerovium (Fl), and combinations thereof. In further embodiments, the inorganic compound comprises at least one Group 14 element selected from the group consisting of Si, Ge, Sn, Pb, Fl, and combinations thereof. In specific embodiments, the Group 14 element of the inorganic compound is Si.

The oxide of the Group 13 and/or Group 14 element in the inorganic compound may vary based on a valency of the Group 13 and/or Group 14 element as well as a geometric structure of its oxide. Specific examples of oxides based on Group 13 and/or Group 14 elements include silicates, carbonates, germinates, borates, aluminates, etc. The specific type of oxide may vary even for a given Group 13 and/or Group 14 element. For example, silicon may form a variety of silicates, such as nesosilicates, sorosilicates, cyclosilicates, tectosilicates, etc., which are all within the scope of oxides of silicon. Further, certain oxides, like tectosilicates, include more than one type of element other than oxygen. Specifically, tectosilicates include both silicon and aluminum, i.e., a combination of Group 13 and Group 14 elements.

The inorganic compound may include moieties and/or substituents in addition to the Group 1 metal and oxide of the Group 13 and/or Group 14 element. Such moieties and/or substituents may be, for example, a $C_1$-$C_{12}$ hydrocarbyl group, which may be substituted or unsubstituted and may optionally include heteroatoms, e.g. S, O, and/or N. One specific example of such an inorganic compound is sodium methyl siliconate.

The inorganic compound may comprise any Group 1 metal in combination with any type of oxide of the Group 13 and/or Group 14 element. Specific examples of exemplary species of inorganic compounds include sodium silicate, sodium carbonate, potassium silicate, sodium germanate, sodium borate, sodium aluminate, lithium silicate, sodium methyl siliconate, and combinations thereof. In various embodiments, the inorganic compound is selected from the group consisting of lithium silicate, sodium silicate, potassium silicate, lithium aluminate, sodium aluminate, potassium aluminate, and combinations thereof.

In specific embodiments, the inorganic compound is sodium silicate. Various types of sodium silicate can be used, including sodium metasilicate. Sodium silicates can be designated as $Na_2O \cdot (SiO_2)_x$ where "x" is the ratio of components and generally falls in the range from 0.4 to 4.0. In various embodiments, the sodium silicate has a $SiO_2/Na_2O$ weight ratio of from about 0.4 to about 4, about 0.5 to about 4, about 1 to about 4, about 1.5 to about 3.5, about 2 to about 3.5, about 2.5 to about 3.5, about 2.75 to about 3.25, or about 3. In other specific embodiments, the inorganic compound is sodium aluminate.

Combinations of different inorganic compounds may be utilized in concert as the inorganic compound. These different inorganic compounds may comprise different Group 1 metals, have different valences, include different types of oxides of the Group 13 and/or Group 14 element, and may have different geometric structures.

Prior to disposing on the fastener, the adhesive composition generally further comprises a vehicle for carrying the inorganic compound. The vehicle generally at least partially solubilizes, alternatively fully solubilizes, the inorganic compound. Typically, the vehicle comprises water, which may originate from various sources and may optionally be purified. The inorganic compound may partially disassociate into ionic form upon solubilizing in water in the adhesive composition. The inorganic compound may be obtained as a mixture or solution in the vehicle, or the inorganic compound may be combined with the vehicle when forming the adhesive composition. The vehicle is useful for applying the adhesive composition to the fastener during manufacture of the coated fastener. However, it is to be appreciated that dry coating techniques may also be utilized to make the coated fastener such that presence of the vehicle is optional.

Prior to disposing the adhesive composition on the fastener, the amount of the inorganic compound in the adhesive composition may vary based on a number of factors, such as vehicle or solvent loading, the presence or absence of optional components, desired properties of the resulting adhesive, etc. Further, the relative amount of the inorganic compound and the vehicle may vary based on properties of the inorganic compound.

With respect to the coated fastener, the inorganic compound is present in an amount of at least about 20 parts by weight based on 100 parts by weight of the adhesive composition. Such amounts are distinguishable from mere additive amounts, for example. In various embodiments, the inorganic compound is present in an amount of at least about 20, at least about 25, at least about 30, at least about 35, at least about 40, at least about 45, at least about 50, at least about 55, at least about 60, at least about 65, at least about 70, at least about 80, at least about 85, at least about 90, or at least about 95, alternatively up to 100, parts by weight, based on 100 parts by weight of the adhesive composition. In further embodiments to the minimum amounts immediately above, the inorganic compound is present in an amount of no greater than 100, no greater than about 99, no greater than about 95, no greater than about 90, no greater than about 85, or no greater than about 80, parts by weight, based on 100 parts by weight of the adhesive composition.

Various ranges and subranges between the aforementioned lower and upper amounts are contemplated, e.g. from about 20 to about 50 parts by weight, from about 35 to about 37 parts by weight, etc. In certain embodiments, the inorganic compound is present in an amount of from about 20 to 100, about 25 to 100, about 25 to about 99, about 25 to about 95, about 30 to about 90, about 30 to about 85, about 30 to about 80, or about 35 to about 75, parts by weight, based on 100 parts by weight of the adhesive composition.

The amounts described in the two paragraphs above with respect to the inorganic compound are generally based on a dry weight basis (or total non-volatile content) of the adhesive composition (or resulting adhesive), i.e., to the exclusion of the optional vehicle or moisture (e.g. water). As such, the amounts described herein can be normalized to compensate for presence of the vehicle or moisture, if present.

Suitable inorganic compounds are commercially available from a number of suppliers, including from Sigma-Aldrich of St. Louis, Mo. Specific examples of suitable grades of sodium silicate are commercially available from PQ Corporation of Malvern, Pa., including K® Sodium Silicate Solution and N® Sodium Silicate Solution.

The adhesive composition may further comprise at least one additive component for modifying at least one property (e.g. a physical property) thereof or of the adhesive formed by curing the adhesive composition. The property may be, for example, installation torque, flow properties, coefficient of friction, viscosity, hardness, etc. Specific examples of suitable additives for use in or as the at least one additive component include surfactants, waxes, fillers, impact modifiers, expansion agents, binders, and combinations thereof. Suitable additives are commercially available from a large number of suppliers.

Specific examples of surfactants suitable for the adhesive composition include ionic, nonionic, and Zwitterionic surfactants. Typically, if surfactants are utilized, the surfactants are nonionic or cationic.

Examples of waxes suitable for the adhesive composition include hydrocarbons, which may be naturally or synthetic and optionally modified. Specific examples of such waxes include those comprising or derived from styrene-acrylonitrile copolymers (SAN), acrylonitrile-butadiene-styrene copolymers (ABS), styrene-butadiene copolymers (SB), polyethylene (HTPE (high-temperature polyethylene), LTPE (low-temperature polyethylene)), polypropylene, poly-1-butene, polytetrafluoroethylene, polyethylene terephthalate (PET), polyamides, polyethylene glycol (PEG), polypropylene glycol, polyether sulfones (PESU or PES), polyvinyl chloride, polyvinylidene chlorides, polystyrene, impact-modified polystyrene, polyvinylcarbazole, polyvinyl acetate, polyisobutylene, polybutadiene, polysulfone, etc., and combinations thereof.

Suitable fillers for the adhesive composition include extending fillers and/or reinforcing fillers. Fibrous materials or fibers are also within the scope of such fillers. Fillers may have a variety of particle sizes, e.g. from dust-like particles to coarse-grain particles to elongated fibers. The filler may be organic and/or inorganic. Specific examples of fillers suitable for the adhesive composition in particle form include clays, such as kaolin; chalk; wollastonite; talcum powder; calcium carbonate; silicates; silica; ferrites; titanium dioxide; zinc oxide; graphite; glass particles, e.g. glass beads; and nanoscale fillers, such as carbon nanotubes, carbon black, nanoscale and other phyllosilicates, nanoscale aluminum oxide ($Al_2O_3$), nanoscale titanium dioxide ($TiO_2$), graphene, and nanoscale silicon dioxide ($SiO_2$). Nanoscale fillers typically have at least one dimension of less than 100 nanometers (nm). Specific examples of fillers suitable for the adhesive composition in fibrous form include boron fibers; glass fibers; carbon fibers; silica fibers; ceramic fibers; basalt fibers; aramid fibers; polyester fibers; nylon fibers; polyethylene fibers; and natural fibers, such as wood fibers, flax fibers, hemp fibers, and sisal fibers. Generally, however, when the adhesive composition is utilized in high temperature environments, the fillers utilized, if any, are inorganic.

Specific examples of expansion agents suitable for the adhesive composition include those that release gasses (or a liquid such as water) upon the application of heat. In other words, the adhesive composition can include an additive that itself acts as or provides a physical blowing agent. Specific examples thereof include azocarbonamides and its activated forms, N,N'-dinitrosopentamethyenetetramine, sulfonyl hydrazides, p-toluenesulfonyl semicarbazide, and 5-phenyltetrazole. Alternatively, the expansion agent may comprise an encapsulated hydrocarbon, e.g. encapsulated butane or propone. In these embodiments, the encapsulated hydrocarbon includes a shell wall which softens or melts at elevated temperatures, resulting in the release of the hydrocarbon in a gaseous form. Alternatively still, the expansion agent may comprise metal hydroxide or other hydrated material, such as magnesium hydroxide, aluminum trihydroxide, sodium sulfate decahydrate, magnesium sulfate heptahydrate, magnesium chloride hexahydrate, etc. In various embodiments, the expansion agent comprises a hydrate. In a specific embodiment, the adhesive composition further comprises alumina trihydrate. Physical blowing agents are useful for expanding the adhesive composition during cure such that the resulting adhesive better locks the coated fastener into place by expanding onto/into opposing surfaces, e.g. complimentary threaded surfaces.

Suitable binders for the adhesive composition include polymers and resins, which may collectively be referred to herein as resinous binders. If utilized, the resinous binder is typically organic. The resinous binder may be curable, i.e., subject to further cross-linking or bonding, or may not further react. Specific examples of suitable resinous binder include phenolics, polyesters, polyvinylbutyral, phenoxys, solid epoxies, polyureas, cellulosic resins, polyurethanes, polyamides, polyethers, alkyds, silicones, acrylonitriles, etc. One specific example of a suitable curable polymer is a (meth)acrylate polymer.

In certain embodiments, the adhesive composition further comprises an acrylic resin. In a specific embodiment, acrylic resin is utilized and the inorganic compound of the adhesive composition comprises sodium aluminate. Incorporation of the binder may be useful for assisting the adhesive composition in wetting out the threaded surface of the fastener during application of the adhesive composition. This is especially true with threaded surfaces having small thread pitches. Moreover, inclusion of the binder may prevent bridging of the adhesive composition during application and/or cure, where the adhesive composition may separate from (or be spaced from) roots of the threaded surface and merely sit across the crests of the threaded surface, which can decrease adhesion.

Any of these additives may be present in the adhesive composition in various amounts. If present, the additives are typically utilized in a collective amount of from greater than 0 to about 75, alternatively from greater than 0 to about 50, parts by weight, based on 100 parts by weight of the adhesive composition. In various embodiments, at least one additive is present in an in an amount of at least about 0.001, alternatively from about 1 to about 75, about 1 to about 50, or about 5 to about 50, parts by weight, based on 100 parts by weight of the adhesive composition. Various ranges and subranges between the aforementioned lower and upper amounts are contemplated.

The adhesive composition on the coated fastener is generally considered to be "dry," i.e., it is dry to the touch such that physical transfer from the coated surface is little to none. That being said, the adhesive composition on the coated fastener generally still has a moisture (or water) content, which may fluctuate based on the components thereof and ambient conditions (e.g. temperature and relative humidity). In various embodiments, the adhesive composition has a moisture content of less than about 20, less than about 15, less than about 10, less than about 5, less than about 1, or approaching 0, parts by weight, based on 100 parts by weight of the adhesive composition. Too much moisture may allow the adhesive composition to slough off the coated fastener, whereas too little moisture, e.g. no moisture, may make the adhesive composition brittle and prone to flaking off the coated fastener.

In various embodiments, the coated fastener further comprises a second composition different from and at least partially disposed over the adhesive composition opposite the threaded surface. The second composition can be formed from various materials and be of various thicknesses. In certain embodiments, the second composition comprises a resinous binder, e.g. an acrylic resin. Other suitable resinous binders are as described above with the optional additives. In specific embodiments, the second composition comprises an acrylic resin and the inorganic compound of the adhesive composition comprises sodium silicate.

If utilized, the second composition can be present in various amounts. Typically, the second composition is present in an amount less than that of the adhesive composition so as to not impede the adhesive composition, e.g. during cure. For example, the second composition may make up about 5 to less than 50, about 10 to about 40, about 15 to about 30, or about 20 to about 25, parts by weight, based on 100 parts by weight of the adhesive composition and second composition combined.

Method of Manufacture

The coated fastener can be made utilizing conventional techniques understood in the coated fastener art. In an exemplary method of manufacture, the method comprises the steps of providing the fastener and providing the adhesive composition. The method further comprises the step of applying the adhesive composition to at least a portion of the threaded surface of the fastener to form a coated fastener. Optionally, the method further comprises the steps of providing and applying the second composition to at least a portion of the adhesive composition.

The adhesive composition is typically liquid so that it may be applied on the threaded surface of the fastener via various wet coating techniques, such as dip coating, spin coating, flow coating, flood coating, spray coating, roll coating, gravure coating, sputtering, slot coating, inkjet printing, and combinations thereof. Typically, dip coating, flow coating, or flood coating are utilized. The adhesive composition may include various amounts of vehicle, e.g. water, depending on the desired viscosity associated with a particular application technique, for example.

The adhesive composition may be applied immediately prior to use of the coated fastener, e.g. by a customer. Alternatively, the adhesive composition may be applied to the threaded surface of the fastener and subsequently shipped or stored as a "pre-applied" adhesive composition. If desired, the adhesive composition may be partially cured or dried as applied, e.g. by heating, to ensure the adhesive composition remains in contact with the threaded surface of the coated fastener.

If desired, an underlying coating may be applied to a portion, a majority, or an entirety of the threaded surface of the fastener prior to applying the adhesive composition such that the adhesive composition does not directly contact the threaded surface of the coated fastener. Typically, however, the adhesive composition is applied directly to the threaded surface of the fastener. Such underlying coatings are typically distinguishable from conventional plating/coating materials present on fasteners.

Alternatively or in addition, one or more compositions or layers may be applied on the adhesive composition. For example, the adhesive composition may be applied to the threaded surface of the fastener to form a base coat layer, and the second composition may be applied on the base coat layer to form a top coat layer. The second composition may be the same as or different from the adhesive composition. Typically, the second composition is different from the adhesive composition such that a layered structure results. The second composition is typically flowable and may be applied via wet coating techniques, as described above. When the base coat and top coat layers are utilized, the layers are typically applied "wet-on-wet." As used herein, the fastener including at least the adhesive composition and optionally the second composition is also referred to as a coated fastener.

The second composition, when different from the adhesive composition, may be selected based on desired properties of the coated fastener. For example, the second composition may be utilized to increase a shelf life of the coated fastener, increase durability of the underlying adhesive composition (e.g. by encapsulation by the second composition), modify a coefficient of friction, etc.

Use of the second composition may be useful for assisting the adhesive composition in wetting out the threaded surface of the fastener during application, e.g. by further wetting out the adhesive composition and thus the threaded surface. This is especially true with threaded surfaces having small thread pitches. Moreover, the second composition may prevent bridging of the adhesive composition during application and/or cure, where the adhesive composition may separate from (or be spaced from) roots of the threaded surface and merely sit across the crests of the threaded surface, which can decrease adhesion.

In certain embodiments, the second composition comprises a polymer or resin in a carrier vehicle. The polymer or resin is typically organic. The polymer or resin may be curable, i.e., subject to further cross-linking or bonding, or may not further react. For example, the polymer or resin may merely be dispersed in a carrier vehicle such that removal of the carrier vehicle results in a dried polymer or resin (or highly viscous polymer or resin) without the formation of additional crosslink sites. Specific examples of suitable polymers and resins include phenolics, polyesters, polyvinylbutyral, phenoxys, solid epoxies, polyureas, cellulosic resins, polyurethanes, polyamides, polyethers, alkyds, silicones, acrylonitriles, etc. One specific example of a suitable curable polymer is a (meth)acrylate polymer. In specific embodiments, the second composition comprises an acrylic resin. The carrier vehicle is typically an organic solvent and may be aliphatic and/or aromatic. Specific examples thereof include alcohols, acetone, methylethyl ketone (MEK), toluene, xylene, heptane, hexane, ethers, etc. The second composition may further comprise any of the additive components mentioned above with regard to the adhesive composition, as well as, for example, a plasticizer. Typically, the adhesive composition and the second composition may be dried (or cured) via similar mechanisms, e.g. heat, so a single drying step may be utilized.

The adhesive composition, and if present, the second composition, may be dried by heating. The adhesive composition typically dries upon exposure to heat, e.g. in an oven or from another heat source. Alternatively, the adhesive composition may be dried at room temperature (e.g. air dried). Typically, drying is carried out at a temperature of no greater than about 100° C. to dry the adhesive composition on the coated fastener. This temperature range can facilitate drying while preventing premature cure or boiling of the adhesive composition (which can disrupt the coating layer and thus adhesion).

Method of Use

The coated fasteners including the adhesive composition may be utilized in diverse applications understood in the coated fastener art, e.g. to join various elements or substrates. In an exemplary method of use, the method comprises the steps of providing adjacent elements and providing the coated fastener. The method further comprises the step of disposing the coated fastener adjacent and/or through the adjacent elements. For example, a coated nut would generally be "adjacent," whereas a coated bolt or screw would generally be "through."

The adhesive is formed from the adhesive composition by curing the adhesive composition. The adhesive composition is typically curable upon exposure to heat, e.g. in an oven or from another heat source. Alternatively, the adhesive composition may be cured at room or ambient temperature, although adhesive properties typically improve with heat curing. Typically, the adhesive composition is heated to a temperature of at least about 150° C. to initiate cure. In various embodiments, the adhesive composition is heated to a temperature of from about 200° C. to about 1000° C., about 250° C. to about 900° C., about ° C. to about 800° C., about 350° C. to about 700° C., about 400° C. to about 600° C., about 400° C. to about 500° C., or about 400° C., to initiate cure of the adhesive composition.

It is to be appreciated that a large temperature range for curing is possible, including temperatures well over 1000° C., provided that the melting point of the inorganic compound is avoided to prevent decomposition. Traditional polymeric adhesives breakdown over time due to much lower degradation temperatures relative to the adhesive of the present invention.

Initiation or activation of the adhesive composition is generally indicated by the material releasing water and blowing the coating outwards during cure. Increasing cure temperature generally increases the rate of blow/outgassing. Expansion of the adhesive composition during cure is generally limited by the chemical makeup and amount of adhesive composition and physical confines of the end application in which the coated fastener is being used. Use or presence of the optional top coat typically increases the "activation" temperature of the coated fastener.

The adhesive has excellent physical properties and may be utilized in diverse applications. Specifically, the adhesive has excellent temperature resistance, durability, and adhesiveness to a variety of substrates. For example, the adhesive can withstand temperatures of at least about 150, at least about 200, at least about 300, at least about 400, at least about 500, at least about 600, at least about 700, at least about 800, at least about 900, at least about 1000, at least about 1100, at least about 1200, at least about 1300, at least about 1400, or at least about 1500, ° C., without deterioration. As such, the coated fasteners of the present invention are well suited for applications involving high temperature environments, including automotive and engine assemblies.

The present invention also provides a substrate including a coated fastener at least partially disposed therein. The coated fastener includes the adhesive composition (and optionally the second composition and any other layers desired) in a partially cured or uncured state. Alternatively, the adhesive composition may be cured such that the coated fastener is bonded to the substrate via the adhesive formed by curing the adhesive composition.

As known in the art, coated fasteners may be utilized to join adjacent elements or substrates. To this end, the substrate may comprise two different elements, substrates, or layers, with the coated fastener disposed adjacent and/or through the substrate. Typically, the substrate defines an aperture, and the coated fastener is disposed in the aperture defined by the substrate. Alternatively, the coated fastener may form the aperture in situ while being disposed in the substrate (e.g. in the case of self-tapping screws). The adhesive composition is particularly suited for use on bolt-and-nut assemblies or other threaded fasteners.

Additional types of suitable fasteners, additives, secondary components (e.g. platings/coatings), methods of manufacture (e.g. coating techniques), and/or uses (e.g. element fastening), are described in U.S. Pat. Nos. 5,426,130; 5,651,824; 5,656,325; 5,672,376; 5,679,160; 5,928,711; 5,964,551; 6,027,568; 6,270,838; 6,322,628; 6,474,919; 6,817,816; 7,404,483; 7,521,402; 7,771,148; 7,772,316; 7,878,744; 8,865,794; and 8,865,812; US Publication Nos. 2008/292426; 2014/0199135; 2015/0014126 and 2015/0056394; and International Publication Nos. WO1999066219; WO2008073262; WO2008094535; WO2008094537; WO2008153866; and WO2008153868; the disclosures of which are hereby incorporated by reference in their entirety.

INDUSTRIAL APPLICABILITY

While the present invention is not limited to a particular end application, use or industry, industrial and automotive equipment manufacturers often rely on coated fasteners to prevent critical parts from failing. The adhesive has excellent physical properties, including adhesive strength to a variety of substrates and high temperature resistance. The adhesive is useful for securely locking the coated fastener in place, such that the coated fastener is resistant to vibration and shock related slippage during use. The adhesive is also useful in applications/environments having temperatures well over 100° C. as described above. As such, the adhesive may also be referred to as "thread lock," "thread adhesive," "fastener adhesive," or "locking adhesive." The adhesive may also be useful for providing a seal against potential leakage of fluids and/or gasses.

The following examples are intended to illustrate the present invention and are not to be viewed in any way as limiting to the scope of the present invention.

EXAMPLES

Working Example 1

An adhesive composition is prepared and utilized to form an adhesive. The adhesive composition is prepared by combining 82.8 parts of a 25% sodium silicate in water solution, 15.1 parts of a 30.5% hydrocarbon wax dispersion in water, 0.8 parts titanium dioxide powder, 0.8 parts of untreated fumed silica, and 0.4 parts of ethoxylated 2,4,7,9-tetramethyl 5 decyn-4,7-diol. The sodium silicate is commercially available from PQ Corporation, and has a $SiO_2/Na_2O$ weight ratio of 3.22. The components are mixed until evenly dispersed to form the adhesive composition. A second composition is prepared by combining 117 parts isopropyl alcohol, 30.2 parts acetone, 7 parts trioctyl trimellitate, and 24.8 parts of a poly(methyl methacrylate/n-butyl methacrylate/methacrylic acid) resin. The resin is dissolved in the second composition. The adhesive composition is utilized to form a base coat layer and the second composition is utilized to form a top coat layer.

The adhesive composition is flow coated on to M10 phosphate bolts to form the base coat layer. Immediately after forming the base coat layer from the adhesive composition, the bolts including the base coat layer are dipped into the second composition so that the entirety of the base coat layer is covered by the second composition, which forms the top coat layer. The bolts including the base and top coat layers are dried at 70° C. for 20 minutes. After drying, the parts are allowed to rest at room temperature ("RT"; 23±3° C.) overnight before installing M10 zinc nuts on each of the parts to form fastener assemblies.

Some of the fastener assemblies are exposed to 400° C. for two hours to measure breakaway torque of the adhesive, which is measured to be 33.3 Nm. Other fastener assemblies are exposed to 600° C. for 1000 hours. After exposure, the adhesives have a breakaway torque of 50.3 Nm at room temperature (i.e., 23±3° C.). The top and base coat layers together have an average K factor of 0.16 and an average thread coefficient of friction of 0.09.

Working Example 2

An adhesive composition is prepared and utilized to form an adhesive. The adhesive composition is prepared by combining 13.6 parts titanium dioxide powder, 1 part untreated fumed silica, and 31.2 parts of a 25% sodium silicate in water solution until all powders were properly dispersed. The sodium silicate is commercially available from PQ Corporation, and is the same grade as Working Example 1.

Some of the adhesive composition is applied to M10 phosphate bolts. Zinc nuts are immediately installed on to the bolts to form fastener assemblies. After curing for 24 hours at room temperature (i.e., 23±3° C.), the average breakaway strength of the adhesive was 4.9 Nm. The fastener assemblies are then exposed to 200° C. for 2 hours. After returning to room temperature, the adhesive had an average breakaway strength of 30.5 Nm, which is significantly improved.

Some of the adhesive composition is applied to M10 stainless steel bolts which are assembled with zinc nuts in an equivalent fashion to form additional fastener assemblies. After 24 hours at room temperature, the additional fastener assemblies were cured at 200° C. for 2 hours then exposed to 812° C. for 5 hours. After returning to room temperature, the average breakaway torque is 3.1 Nm. However, this breakaway torque was due to substrate failure, not adhesive failure. As such, the latter value is not representative of the actual breakaway torque of the adhesive itself.

Physical Property Determination and Additional Working Examples 3 and 4

Various physical properties are determined with respect to the adhesive composition and coated fastener of Example 1 described above. Specifically, data on room temperature breakaway, chemical resistance, environmental cycling, friction, hot strength, adhesive activation rate (or "special cycling"), and heat aging, is determined and recorded. As illustrated in the tables below, the adhesive compositions, the adhesives formed therefrom, and the coated fasteners of the present invention utilizing the same, have excellent physical properties.

With reference to the various tables below, "DP" is dry phosphate, "Zn" is electroplated zinc; "Zn Flake" is zinc flake; "Al" is aluminum; "Inst." is install torque; "Break." is breakaway torque; "Prev." is prevailing torque; "Thread CoF" is thread coefficient of friction; "SS" is stainless steel; "PS" is plain steel; "Ave" or "Avg." is average; and "--" or "N/A" means not determined or available. Moreover, with respect to certain fastener assembly designations below, e.g. "DP/Zn," the first designation is a bolt finish and the second designation is a nut finish. The adhesive composition is typically applied to the bolt rather than the nut for ease of application, unless indicated otherwise.

All measurements were measured as per ASTM D5649. The term "Hot Strength," indicates a fastener assembly exposed to the listed temperature, and a breakaway test performed at the designated temperature. The term "Heat Cure," indicates a fastener assembly that is exposed to an elevated temperature then brought back down to room temperature (i.e., 23±3° C.) prior to performing the breakaway test. Unless indicated otherwise, the coated fasteners are installed at room temperature with installation torque being recorded. Moreover, the adhesive compositions are generally cured at 400° C. for at least 1 hour prior to testing breakaway torque testing. Torque values are generally provided in pound-force inch ("lbf-in") unless indicated otherwise.

Room Temperature Break

| DP/Zn | Inst. | Break. | Prev. | Zn Flake/Zn | Inst. | Break. | Prev. |
|---|---|---|---|---|---|---|---|
| 1 | 90 | 80 | 100 | 1 | 70 | 50 | 50 |
| 2 | 60 | 40 | 35 | 2 | 75 | 55 | 60 |
| 3 | 75 | 75 | 70 | 3 | 80 | 75 | 65 |
| 4 | 80 | 60 | 70 | 4 | 90 | 90 | 70 |
| 5 | 75 | 70 | 70 | 5 | 50 | 35 | 20 |
| 6 | 65 | 40 | 35 | 6 | 70 | 60 | 60 |
| 7 | 65 | 60 | 50 | 7 | 85 | 80 | 85 |
| 8 | 50 | 40 | 35 | 8 | 90 | 90 | 70 |
| 9 | 55 | 40 | 40 | 9 | 50 | 35 | 20 |
| 10 | 65 | 45 | 45 | 10 | 90 | 80 | 70 |
| Torque Ave (lbf-in) | 68.00 | 55.00 | 55.00 | Torque Ave (lbf-in) | 75.00 | 65.00 | 57.00 |
| Torque Ave (Nm) | 7.684 | 6.215 | 6.215 | Torque Ave (Nm) | 8.475 | 7.345 | 6.441 |

Chemical Resistance (according to GMW14657 specification)
5W30 Synthetic Engine Oil @ 150° C.

| DP/Zn | Inst. | Break. | Prev. | Zn Flake/Zn | Inst. | Break. | Prev. |
|---|---|---|---|---|---|---|---|
| 1 | 55 | 110 | 30 | 1 | 85 | 160 | 60 |
| 2 | 35 | 120 | 40 | 2 | 50 | 135 | 40 |
| 3 | 45 | 115 | 35 | 3 | 60 | 130 | 30 |
| 4 | 55 | 85 | 25 | 4 | 40 | 105 | 40 |
| 5 | 35 | 60 | 20 | 5 | 45 | 130 | 40 |
| 6 | 35 | 110 | 40 | 6 | 70 | 145 | 40 |
| 7 | 45 | 140 | 40 | 7 | 60 | 135 | 40 |
| 8 | 30 | 150 | 45 | 8 | 70 | 140 | 40 |
| 9 | 50 | 125 | 40 | 9 | 60 | 130 | 45 |
| 10 | 45 | 110 | 30 | 10 | 145 | 140 | 50 |
| Torque Ave (lbf-in) | 43.00 | 112.50 | 34.50 | Torque Ave (lbf-in) | 68.50 | 135.00 | 42.50 |
| Torque Ave (Nm) | 4.859 | 12.713 | 3.899 | Torque Ave (Nm) | 7.741 | 15.255 | 4.803 |

Brake Fluid @ 150° C.

| DP/Zn | Inst. | Break. | Prev. | Zn Flake/Zn | Inst. | Break. | Prev. |
|---|---|---|---|---|---|---|---|
| 1 | 40 | 10 | 10 | 1 | 60 | 60 | 25 |
| 2 | 35 | 35 | 25 | 2 | 40 | 15 | 15 |
| 3 | 60 | 15 | 25 | 3 | 75 | 25 | 18 |
| 4 | 70 | 35 | 25 | 4 | 50 | 6 | 8 |
| 5 | 50 | 20 | 20 | 5 | 45 | 30 | 20 |
| 6 | 50 | 15 | 20 | 6 | 65 | 45 | 25 |
| 7 | 45 | 70 | 25 | 7 | 55 | 5 | 5 |
| 8 | 65 | 7 | 10 | 8 | 60 | 75 | 25 |
| 9 | 55 | 30 | 25 | 9 | 120 | 60 | 25 |
| 10 | 45 | 20 | 25 | 10 | 60 | 60 | 25 |

-continued

| Brake Fluid @ 150° C. | | | | | | | |
|---|---|---|---|---|---|---|---|
| DP/Zn | Inst. | Break. | Prev. | Zn Flake/Zn | Inst. | Break. | Prev. |
| Torque Ave (lbf-in) | 51.50 | 25.70 | 21.00 | Torque Ave (lbf-in) | 63.00 | 38.10 | 19.10 |
| Torque Ave (Nm) | 5.820 | 2.904 | 2.373 | Torque Ave (Nm) | 7.119 | 4.305 | 2.158 |

| Transmission Fluid @ 150° C. | | | | | | | |
|---|---|---|---|---|---|---|---|
| DP/Zn | Inst. | Break. | Prev. | Zn Flake/Zn | Inst. | Break. | Prev. |
| 1 | 75 | 60 | 20 | 1 | 100 | 110 | 35 |
| 2 | 60 | 90 | 30 | 2 | 60 | 120 | 35 |
| 3 | 30 | 180 | 65 | 3 | 90 | 10 | 30 |
| 4 | 80 | 120 | 40 | 4 | 65 | 135 | 55 |
| 5 | 60 | 85 | 25 | 5 | 55 | 130 | 40 |
| 6 | 40 | 105 | 30 | 6 | 80 | 100 | 25 |
| 7 | 65 | 110 | 50 | 7 | 60 | 130 | 40 |
| 8 | 45 | 100 | 25 | 8 | 45 | 105 | 25 |
| 9 | 45 | 100 | 30 | 9 | 85 | 130 | 50 |
| 10 | 60 | 160 | 60 | 10 | 80 | 120 | 45 |
| Torque Ave (lbf-in) | 56.00 | 111.00 | 37.50 | Torque Ave (lbf-in) | 72.00 | 109.00 | 38.00 |
| Torque Ave (Nm) | 6.328 | 12.543 | 4.238 | Torque Ave (Nm) | 8.136 | 12.317 | 4.294 |

| Gasoline @ 23° C. | | | | | | | |
|---|---|---|---|---|---|---|---|
| DP/Zn | Inst. | Break. | Prev. | Zn Flake/Zn | Inst. | Break. | Prev. |
| 1 | 50 | 5 | 11 | 1 | 55 | 5 | 4 |
| 2 | 60 | 12 | 12 | 2 | 85 | 12 | 10 |
| 3 | 75 | 6 | 5 | 3 | 30 | 60 | 65 |
| 4 | 50 | 11 | 10 | 4 | 70 | 7 | 5 |
| 5 | 55 | 8 | 6 | 5 | 60 | 4 | 4 |
| 6 | 35 | 18 | 22 | 6 | 110 | 6 | 6 |
| 7 | 40 | 24 | 23 | 7 | 70 | 4 | 4 |
| 8 | 85 | 2 | 4 | 8 | 80 | 5 | 4 |
| 9 | 45 | 5 | 6 | 9 | 115 | 8 | 6 |
| 10 | 90 | 17 | 18 | 10 | 60 | 21 | 21 |
| Torque Ave (lbf-in) | 58.50 | 10.80 | 11.70 | Torque Ave (lbf-in) | 73.50 | 13.20 | 12.90 |
| Torque Ave (Nm) | 6.611 | 1.220 | 1.322 | Torque Ave (Nm) | 8.306 | 1.492 | 1.458 |

| Water/Glycol @ 110° C. | | | | | | | |
|---|---|---|---|---|---|---|---|
| DP/Zn | Inst. | Break. | Prev. | Zn Flake/Zn | Inst. | Break. | Prev. |
| 1 | 55 | 65 | 10 | 1 | 75 | 110 | 20 |
| 2 | 40 | 80 | 10 | 2 | 50 | 40 | 10 |
| 3 | 40 | 200 | 30 | 3 | 45 | 55 | 20 |
| 4 | 50 | 140 | 20 | 4 | 75 | 160 | 20 |
| 5 | 60 | 90 | 20 | 5 | 170 | 125 | 25 |
| 6 | 40 | 170 | 20 | 6 | 75 | 80 | 20 |
| 7 | 65 | 140 | 20 | 7 | 60 | 260 | 40 |
| 8 | 50 | 130 | 20 | 8 | 60 | 200 | 40 |
| 9 | 60 | 160 | 25 | 9 | 90 | 180 | 35 |
| 10 | 25 | 160 | 25 | 10 | 65 | 150 | 40 |
| Torque Ave (lbf-in) | 48.50 | 133.50 | 20.00 | Torque Ave (lbf-in) | 76.50 | 136.00 | 27.00 |
| Torque Ave (Nm) | 5.481 | 15.086 | 2.260 | Torque Ave (Nm) | 8.645 | 15.368 | 3.051 |

| Environmental Cycling (according to GMW14657 Grade C specification) | | | | | | | |
|---|---|---|---|---|---|---|---|
| DP/Al | Inst. | Break. | Prev. | Zn Flake/Al | Inst. | Break. | Prev. |
| 1 | 80 | 375 | 100 | 1 | 110 | 230 | 110 |
| 2 | 70 | 225 | 25 | 2 | 140 | 450 | 75 |
| 3 | 100 | 200 | 50 | 3 | 100 | 350 | 100 |
| 4 | 95 | 325 | 50 | 4 | 90 | 450 | 75 |
| 5 | 85 | 350 | 50 | 5 | 150 | 500 | 125 |
| 6 | 120 | 425 | 100 | 6 | 185 | 400 | 100 |
| 7 | 115 | 275 | 50 | 7 | 100 | 450 | 125 |
| 8 | 85 | 300 | 50 | 8 | 120 | 300 | 75 |
| 9 | 100 | 300 | 50 | 9 | 120 | 400 | 100 |
| 10 | 95 | 200 | 50 | 10 | 120 | 425 | 50 |
| Torque Ave (lbf-in) | 94.50 | 297.50 | 57.50 | Torque Ave (lbf-in) | 123.50 | 395.50 | 93.50 |
| Torque Ave (Nm) | 10.679 | 33.618 | 6.498 | Torque Ave (Nm) | 13.956 | 44.692 | 10.566 |

| Friction Data (according to GMW14657 specification) | | | | | |
|---|---|---|---|---|---|
| DP/Zn | K Factor | Thread CoF | Zn Flake/Zn | K Factor | Thread CoF |
| 1 | 0.18 | 0.09 | 1 | 0.16 | 0.11 |
| 2 | 0.16 | 0.08 | 2 | 0.16 | 0.11 |
| 3 | 0.15 | 0.09 | 3 | 0.16 | 0.1 |
| 4 | 0.15 | 0.09 | 4 | 0.16 | 0.09 |
| 5 | 0.15 | 0.1 | 5 | 0.15 | 0.11 |
| Ave | 0.16 | 0.09 | Ave | 0.16 | 0.10 |

| Hot Strength @ 400° C. | | | | | | | |
|---|---|---|---|---|---|---|---|
| DP/Zn | Inst. | Break. | Prev. | Zn Flake/Zn | Inst. | Break. | Prev. |
| 1 | 100 | 325 | 80 | 1 | 85 | 400 | 600 |
| 2 | 110 | 225 | 60 | 2 | 150 | 350 | 100 |
| 3 | 85 | 325 | 75 | 3 | 100 | 325 | 100 |
| 4 | 50 | 300 | 70 | 4 | 150 | 425 | 125 |
| 5 | 70 | 250 | 80 | 5 | 140 | 350 | 600 |
| 6 | 70 | 325 | 100 | 6 | 70 | 375 | 450 |
| 7 | 95 | 375 | 75 | 7 | 120 | 350 | 75 |
| 8 | 60 | 250 | 100 | 8 | 145 | 375 | 600 |
| 9 | 50 | 300 | 100 | 9 | 90 | 400 | 600 |
| 10 | 125 | 275 | 60 | 10 | 95 | 425 | 225 |
| Torque Ave (lbf-in) | 81.50 | 295.00 | 80.00 | Torque Ave (lbf-in) | 114.50 | 377.50 | 347.50 |
| Torque Ave (Nm) | 9.210 | 33.335 | 9.040 | Torque Ave (Nm) | 12.939 | 42.658 | 39.268 |

| Hot Strength @ 250° C. | | | | | | | |
|---|---|---|---|---|---|---|---|
| DP/Zn | Inst. | Break. | Prev. | Zn Flake/Zn | Inst. | Break. | Prev. |
| 1 | 120 | 160 | 20 | 1 | 110 | 140 | 30 |
| 2 | 85 | 50 | 25 | 2 | 115 | 150 | 40 |
| 3 | 100 | 80 | 20 | 3 | 160 | 160 | 30 |
| 4 | 60 | 45 | 30 | 4 | 90 | 130 | 35 |
| 5 | 60 | 100 | 50 | 5 | 110 | 140 | 30 |
| 6 | 80 | 90 | 30 | 6 | 100 | 170 | 40 |
| 7 | 60 | 150 | 25 | 7 | 65 | 65 | 25 |
| 8 | 70 | 120 | 50 | 8 | 100 | 70 | 35 |
| 9 | 70 | 120 | 40 | 9 | 140 | 80 | 25 |
| 10 | 70 | 170 | 30 | 10 | 65 | 170 | 45 |
| Torque Ave (lbf-in) | 77.50 | 108.50 | 32.00 | Torque Ave (lbf-in) | 105.50 | 127.50 | 33.50 |
| Torque Ave (Nm) | 8.758 | 12.261 | 3.616 | Torque Ave (Nm) | 11.922 | 14.408 | 3.786 |

| Hot Strength @ 200° C. | | | | | | | |
|---|---|---|---|---|---|---|---|
| DP/Zn | Inst. | Break. | Prev. | Zn Flake/Zn | Inst. | Break. | Prev. |
| 1 | 95 | 50 | 25 | 1 | 100 | 55 | 35 |
| 2 | 100 | 120 | 35 | 2 | 110 | 25 | 25 |
| 3 | 70 | 85 | 25 | 3 | 110 | 40 | 35 |
| 4 | 65 | 90 | 25 | 4 | 130 | 120 | 20 |
| 5 | 95 | 150 | 10 | 5 | 85 | 80 | 20 |
| 6 | 100 | 140 | 25 | 6 | 75 | 45 | 25 |
| 7 | 100 | 100 | 30 | 7 | 130 | 55 | 35 |
| 8 | 65 | 100 | 35 | 8 | 105 | 40 | 20 |
| 9 | 75 | 50 | 30 | 9 | 65 | 85 | 30 |
| 10 | N/A | N/A | N/A | 10 | 85 | 120 | 40 |
| Torque Ave (lbf-in) | 85.00 | 98.33 | 26.67 | Torque Ave (lbf-in) | 99.50 | 66.50 | 28.50 |
| Torque Ave (Nm) | 9.605 | 11.112 | 3.013 | Torque Ave (Nm) | 11.244 | 7.515 | 3.221 |

| Special Cycle 1 (temperature ramping) | | | | | | |
|---|---|---|---|---|---|---|
| DP/Zn | | | Zn Flake/Zn | | | |
| Inst. | Break. | Prev. | Inst. | Break. | Prev. | |
| 10 min. @ 125° C. | 80 | 30 | 40 | 10 min. @ 125° C. | 100 | 75 | 100 |
| | 120 | 22 | 30 | | 85 | 40 | 40 |
| | 70 | 24 | 32 | | 90 | 20 | 25 |
| | 160 | 36 | 50 | | 115 | 32 | 46 |
| | 130 | 50 | 70 | | 75 | 65 | 90 |
| Avg.- | 112.00 | 32.40 | 44.40 | Avg.- | 93.00 | 46.40 | 60.20 |
| Cool to RT | 140 | 110 | 120 | Cool to RT | 140 | 95 | 90 |
| | 120 | 130 | 120 | | 50 | 40 | 40 |
| | 85 | 50 | 60 | | 120 | 90 | 115 |
| | 80 | 95 | 90 | | 60 | 125 | 120 |
| | 80 | 65 | 85 | | 130 | 190 | 175 |
| Avg.- | 101.00 | 90.00 | 95.00 | Avg.- | 100.00 | 108.00 | 108.00 |
| 1 hr @ 125° C. | 80 | 10 | 3 | 1 hr @ 125° C. | 90 | 7 | 7 |
| | 120 | 10 | 15 | | 100 | 5.5 | 7 |
| | 75 | 14 | 5 | | 60 | 5 | 4 |
| | 100 | 5 | 3 | | 120 | 6.5 | 6 |
| | 100 | 7 | 8 | | 120 | 6 | 3.5 |
| Avg.- | 95.00 | 9.20 | 6.80 | Avg.- | 98.00 | 6.00 | 5.50 |
| Cool to RT | 110 | 90 | 50 | Cool to RT | 120 | 70 | 50 |
| | 90 | 110 | 70 | | 105 | 80 | 50 |
| | 80 | 110 | 130 | | 120 | 75 | 50 |
| | 90 | 90 | 50 | | 40 | 50 | 30 |
| | 60 | 110 | 110 | | 80 | 60 | 45 |
| Avg.- | 86.00 | 102.00 | 82.00 | Avg.- | 93.00 | 67.00 | 45.00 |
| 1 hr @ 125° C. | 75 | 4 | 3 | 1 hr @ 125° C. | 50 | 8 | 6.5 |
| | 90 | 10 | 8.5 | | 150 | 5.5 | 4.5 |
| | 85 | 7.5 | 7.5 | | 120 | 5 | 6 |
| | 150 | 8 | 6 | | 80 | 6 | 4 |
| | 80 | 5.5 | 4.5 | | 100 | 4.5 | 5.5 |
| Avg.- | 96.00 | 7.00 | 5.90 | Avg.- | 100.00 | 5.80 | 5.30 |
| Cool to RT | 110 | 80 | 70 | Cool to RT | 70 | 95 | 80 |
| | 100 | 70 | 50 | | 70 | 90 | 95 |
| | 70 | 160 | 100 | | 70 | 90 | 100 |
| | 65 | 70 | 60 | | 100 | 95 | 100 |
| | 190 | 100 | 70 | | 140 | 80 | 60 |
| Avg.- | 107.00 | 96.00 | 70.00 | Avg.- | 90.00 | 90.00 | 87.00 |
| 1 hr @ 125° C. | 110 | 5.5 | 6.5 | 1 hr @ 125° C. | 70 | 2.5 | 3 |
| | 90 | 4 | 1.5 | | 75 | 7 | 4.5 |
| | 85 | 7 | 4 | | 125 | 6 | 6 |
| | 80 | 9 | 7 | | 60 | 6 | 7 |
| | 80 | 7.5 | 5.5 | | 75 | 5 | 5.5 |
| Avg.- | 89.00 | 6.60 | 4.90 | Avg.- | 81.00 | 5.30 | 5.20 |
| Cool to RT | 90 | 90 | 85 | Cool to RT | 80 | 135 | 110 |
| | 80 | 105 | 50 | | 105 | 70 | 30 |
| | 115 | 120 | 70 | | 85 | 45 | 20 |
| | 95 | 70 | 40 | | 65 | 100 | 90 |
| | 110 | 90 | 40 | | 110 | 75 | 45 |
| Avg.- | 98.00 | 95.00 | 57.00 | Avg.- | 89.00 | 85.00 | 59.00 |
| 1 hr @ 125° C. | 70 | 10 | 9 | 1 hr @ 125° C. | 80 | 6.5 | 4.5 |
| | 80 | 5 | 4 | | 70 | 9.5 | 10 |
| | 110 | 9.5 | 6.5 | | 120 | 7 | 7 |
| | 85 | 6 | 2 | | 90 | 6.5 | 9 |
| | 120 | 9 | 3 | | 125 | 9 | 7.5 |
| Avg.- | 93.00 | 7.90 | 4.90 | Avg.- | 97.00 | 7.70 | 7.60 |
| Cool to RT | 60 | 110 | 50 | Cool to RT | 85 | 60 | 30 |
| | 90 | 85 | 40 | | 60 | 100 | 40 |
| | 100 | 100 | 45 | | 130 | 105 | 75 |
| | 75 | 80 | 40 | | 90 | 80 | 45 |
| | 120 | 120 | 60 | | 100 | 110 | 45 |
| Avg.- | 89.00 | 99.00 | 47.00 | Avg.- | 93.00 | 91.00 | 47.00 |

| Special Cycle 1 - Results | | | | | |
|---|---|---|---|---|---|
| 125° C. | Break. | Prev. | 125° C. | Break. | Prev. |
| Torque Ave (lbf-in) | 7.68 | 5.63 | Torque Ave (lbf-in) | 6.13 | 5.50 |
| Torque Ave (Nm) | 0.868 | 0.636 | Torque Ave (Nm) | | |
| RT | Break. | Prev. | RT | Break. | Prev. |
| Torque Ave (lbf-in) | 96.40 | 70.20 | Torque Ave (lbf-in) | 88.20 | 69.20 |
| Torque Ave (Nm) | 10.89 | 7.932 | Torque Ave (Nm) | 9.965 | 7.819 |

| Special Cycle 2 (temperature ramping) | | | | | | |
|---|---|---|---|---|---|---|
| DP/Zn | | | Zn Flake/Zn | | | |
| Inst. | Break. | Prev. | Inst. | Break. | Prev. | |
| 10 min. @ 125° C. | 65 | 30 | 40 | 10 min. @ 125° C. | 95 | 55 | 55 |
| | 50 | 35 | 40 | | 80 | 35 | 45 |
| | 70 | 50 | 55 | | 50 | 15 | 25 |
| | 65 | 30 | 35 | | 85 | 45 | 50 |
| | 70 | 20 | 30 | | 90 | 35 | 35 |

Special Cycle 2 (temperature ramping)

| | DP/Zn | | | | Zn Flake/Zn | | |
|---|---|---|---|---|---|---|---|
| | Inst. | Break. | Prev. | | Inst. | Break. | Prev. |
| Avg.- | 64.00 | 33.00 | 40.00 | Avg.- | 80.00 | 37.00 | 42.00 |
| Cool | 60 | 20 | 30 | Cool | 70 | 50 | 50 |
| to | 70 | 30 | 35 | to | 75 | 60 | 75 |
| RT | 65 | 40 | 50 | RT | 95 | 30 | 25 |
| | 70 | 35 | 50 | | 40 | 120 | 110 |
| | 45 | 45 | 45 | | 80 | 35 | 40 |
| Avg.- | 62.00 | 34.00 | 42.00 | Avg.- | 72.00 | 59.00 | 60.00 |
| 1 hr | 45 | 20 | 25 | 1 hr | 90 | 10 | 15 |
| @ | 75 | 25 | 20 | @ | 95 | 5 | 5 |
| 200° | 60 | 10 | 5 | 200° | 55 | 20 | 10 |
| C. | 50 | 25 | 10 | C. | 40 | 5 | 15 |
| | 70 | 15 | 15 | | 60 | 35 | 25 |
| Avg.- | 60.00 | 19.00 | 15.00 | Avg.- | 68.00 | 15.00 | 14.00 |
| Cool | 45 | 90 | 55 | Cool | 80 | 120 | 60 |
| to | 55 | 120 | 35 | to | 40 | 110 | 50 |
| RT | 50 | 100 | 35 | RT | 70 | 110 | 45 |
| | 60 | 100 | 50 | | 90 | 80 | 30 |
| | 60 | 115 | 50 | | 70 | 150 | 80 |
| Avg.- | 54.00 | 105.00 | 45.00 | Avg.- | 70.00 | 114.00 | 53.00 |
| 1 hr | 60 | 23 | 10 | 1 hr | 60 | 8 | 4 |
| @ | 50 | 16 | 17 | @ | 75 | 9 | 4 |
| 200° | 40 | 24 | 22 | 200° | 100 | 12 | 5 |
| C. | 65 | 23 | 21 | C. | 35 | 16 | 15 |
| | 85 | 14 | 19 | | 50 | 3 | 4 |
| Avg.- | 60.00 | 20.00 | 17.80 | Avg.- | 64.00 | 9.60 | 6.40 |
| Cool | 65 | 80 | 30 | Cool | 85 | 140 | 60 |
| to | 40 | 170 | 80 | to | 110 | 160 | 80 |
| RT | 50 | 100 | 40 | RT | 50 | 160 | 75 |
| | 50 | 180 | 50 | | 40 | 120 | 60 |
| | 45 | 120 | 55 | | 120 | 120 | 40 |
| Avg.- | 50.00 | 130.00 | 51.00 | Avg.- | 81.00 | 140.00 | 63.00 |
| 1 hr | 45 | 12 | 5 | 1 hr | 80 | 15 | 8 |
| @ | 70 | 17 | 19 | @ | 65 | 9 | 11 |
| 200° | 35 | 22 | 15 | 200° | 55 | 9 | 8 |
| C. | 60 | 30 | 21 | C. | 50 | 15 | 12 |
| | 70 | 16 | 12 | | 85 | 20 | 12 |
| Avg.- | 56.00 | 19.40 | 14.40 | Avg.- | 67.00 | 13.60 | 10.20 |
| Cool | 70 | 140 | 45 | Cool | 35 | 170 | 60 |
| to | 60 | 125 | 40 | to | 70 | 160 | 60 |
| RT | 65 | 130 | 40 | RT | 60 | 180 | 60 |
| | 50 | 150 | 65 | | 50 | 110 | 30 |
| | 35 | 130 | 40 | | 100 | 130 | 50 |
| Avg.- | 56.00 | 135.00 | 46.00 | Avg.- | 63.00 | 150.00 | 52.00 |
| 1 hr | 55 | 30 | 25 | 1 hr | 80 | 20 | 7 |
| @ | 40 | 30 | 20 | @ | 90 | 25 | 11 |
| 200° | 60 | 35 | 20 | 200° | 105 | 19 | 13 |
| C. | 40 | 30 | 20 | C. | 90 | 30 | 20 |
| | 35 | 35 | 25 | | 90 | 15 | 10 |
| Avg.- | 46.00 | 32.00 | 22.00 | Avg.- | 91.00 | 21.80 | 12.20 |
| Cool | 50 | 60 | 60 | Cool | 70 | 250 | 100 |
| to | 70 | 120 | 35 | to | 95 | 180 | 90 |
| RT | 35 | 140 | 40 | RT | 100 | 190 | 70 |
| | 55 | 140 | 45 | | 60 | 325 | 100 |
| | 35 | 130 | 40 | | 40 | 75 | 80 |
| Avg.- | 49.00 | 118.00 | 44.00 | Avg.- | 73.00 | 204.00 | 88.00 |

Special Cycle 2 - Results

| 200° C. | Break. | Prev. | 200° C. | Break. | Prev. |
|---|---|---|---|---|---|
| Torque Ave (lbf-in) | 22.60 | 17.30 | Torque Ave (lbf-in) | 18.25 | 12.75 |
| Torque Ave (Nm) | 2.553 | 1.955 | Torque Ave (Nm) | 2.062 | 1.441 |

| RT | Break. | Prev. | RT | Break. | Prev. |
|---|---|---|---|---|---|
| Torque Ave (lbf-in) | 104.40 | 45.60 | Torque Ave (lbf-in) | 133.40 | 63.20 |
| Torque Ave (Nm) | 11.796 | 5.152 | Torque Ave (Nm) | 15.072 | 7.141 |

Special Cycle 3 (temperature ramping)

| | DP/Zn | | | | Zn Flake/Zn | | |
|---|---|---|---|---|---|---|---|
| | Inst. | Break. | Prev. | | Inst. | Break. | Prev. |
| 10 min. @ 125° C. | 60 | 50 | 60 | 10 min. @ 125° C. | 120 | 70 | 80 |
| | 80 | 20 | 25 | | 120 | 40 | 50 |
| | 100 | 45 | 45 | | 125 | 120 | 100 |
| | 50 | 40 | 45 | | 100 | 40 | 40 |
| | 70 | 15 | 20 | | 100 | 70 | 70 |
| Avg.- | 72.00 | 34.00 | 39.00 | Avg.- | 113.00 | 68.00 | 68.00 |
| Cool | 55 | 45 | 50 | Cool | 160 | 80 | 85 |
| to | 80 | 35 | 40 | to | 115 | 190 | 190 |
| RT | 70 | 80 | 85 | RT | 65 | 100 | 105 |
| | 100 | 110 | 105 | | 85 | 90 | 100 |
| | 100 | 60 | 55 | | 75 | 170 | 145 |
| Avg.- | 81.00 | 66.00 | 67.00 | Avg.- | 100.00 | 126.00 | 125.00 |
| 1 hr | 65 | 25 | 10 | 1 hr | 130 | 45 | 25 |
| @ | 70 | 30 | 15 | @ | 140 | 25 | 20 |
| 250° | 75 | 30 | 15 | 250° | 70 | 65 | 20 |
| C. | 50 | 20 | 20 | C. | 160 | 100 | 30 |
| | 60 | 35 | 15 | | 110 | 60 | 30 |
| Avg.- | 64.00 | 28.00 | 15.00 | Avg.- | 122.00 | 59.00 | 25.00 |
| Cool | 65 | 200 | 80 | Cool | 90 | 210 | 80 |
| to | 105 | 190 | 70 | to | 100 | 230 | 70 |
| RT | 110 | 220 | 110 | RT | 90 | 240 | 90 |
| | 50 | 170 | 70 | | 90 | 180 | 55 |
| | 95 | 150 | 60 | | 85 | 130 | 110 |
| Avg.- | 85.00 | 186.00 | 78.00 | Avg.- | 91.00 | 198.00 | 81.00 |
| 1 hr | 80 | 40 | 20 | 1 hr | 115 | 35 | 25 |
| @ | 80 | 80 | 25 | @ | 65 | 55 | 25 |
| 250° | 55 | 100 | 25 | 250° | 105 | 125 | 40 |
| C. | 85 | 55 | 20 | C. | 70 | 80 | 30 |
| | 75 | 70 | 35 | | 130 | 50 | 25 |
| Avg.- | 75.00 | 69.00 | 25.00 | Avg.- | 97.00 | 69.00 | 29.00 |
| Cool | 70 | 190 | 70 | Cool | 70 | 350 | 125 |
| to | 60 | 425 | 70 | to | 80 | 250 | 75 |
| RT | 40 | 250 | 50 | RT | 150 | 160 | 70 |
| | 70 | 200 | 100 | | 65 | 250 | 80 |
| | 75 | 220 | 60 | | 60 | 240 | 80 |
| Avg.- | 63.00 | 257.00 | 70.00 | Avg.- | 85.00 | 250.00 | 86.00 |
| 1 hr | 50 | 50 | 15 | 1 hr | 60 | 50 | 30 |
| @ | 100 | 65 | 25 | @ | 140 | 65 | 25 |
| 250° | 105 | 200 | 30 | 250° | 110 | 80 | 30 |
| C. | 95 | 170 | 35 | C. | 125 | 80 | 25 |
| | 95 | 90 | 30 | | 70 | 95 | 35 |
| Avg.- | 89.00 | 115.00 | 27.00 | Avg.- | 101.00 | 74.00 | 29.00 |
| Cool | 55 | 375 | 50 | Cool | 135 | 250 | 75 |
| to | 70 | 225 | 50 | to | 100 | 200 | 75 |
| RT | 70 | 300 | 75 | RT | 50 | 200 | 70 |
| | 0 | 350 | 50 | | 115 | 220 | 60 |
| | 100 | 275 | 75 | | 80 | 290 | 90 |
| Avg.- | 59.00 | 305.00 | 60.00 | Avg.- | 96.00 | 232.00 | 74.00 |
| 1 hr | 110 | 75 | 25 | 1 hr | 115 | 110 | 40 |
| @ | 60 | 110 | 30 | @ | 100 | 35 | 25 |
| 250° | 50 | 70 | 30 | 250° | 85 | 60 | 35 |
| C. | 90 | 110 | 50 | C. | 100 | 200 | 40 |
| | 105 | 90 | 30 | | 115 | 70 | 30 |
| Avg.- | 83.00 | 91.00 | 33.00 | Avg.- | 103.00 | 95.00 | 34.00 |
| Cool | 55 | 250 | 100 | Cool | 100 | 300 | 100 |
| to | 65 | 325 | 100 | to | 135 | 250 | 75 |
| RT | 70 | 350 | 75 | RT | 70 | 200 | 50 |
| | 70 | 350 | 125 | | 110 | 275 | 75 |
| | 35 | 275 | 75 | | 60 | 200 | 75 |
| Avg.- | 59.00 | 310.00 | 95.00 | Avg.- | 95.00 | 245.00 | 75.00 |

Special Cycle 3 - Results

| 200° C. | Break. | Prev. | 200° C. | Break. | Prev. |
|---|---|---|---|---|---|
| Torque Ave (lbf-in) | 75.75 | 25.00 | Torque Ave (lbf-in) | 68.75 | 30.00 |
| Torque Ave (Nm) | 8.559 | 2.825 | Torque Ave (Nm) | 7.768 | 3.390 |

Special Cycle 3 - Results (continued)

| RT | Break. | Prev. | RT | Break. | Prev. |
|---|---|---|---|---|---|
| Torque Ave (lbf-in) | 224.80 | 74.00 | Torque Ave (lbf-in) | 210.20 | 88.20 |
| Torque Ave (Nm) | 25.399 | 8.361 | Torque Ave (Nm) | 23.750 | 9.965 |

Heat Aging
500 hours @ 600° C. (tested at RT)

| DP/Al | Inst. | Break. | Prev. | Zn Flake/Al | Inst. | Break. | Prev. |
|---|---|---|---|---|---|---|---|
| 1 | 100 | 325 | 250 | 1 | 125 | 225 | 100 |
| 2 | 110 | 200 | 75 | 2 | 140 | 190 | 85 |
| 3 | 90 | 325 | 225 | 3 | 120 | 170 | 75 |
| 4 | 85 | 225 | 125 | 4 | 90 | 180 | 50 |
| 5 | 110 | 250 | 150 | 5 | 165 | 180 | 100 |
| Torque Ave (lbf-in) | 99.00 | 265.00 | 165.00 | Torque Ave (lbf-in) | 128.00 | 189.00 | 82.00 |
| Torque Ave (Nm) | 11.187 | 29.945 | 18.645 | Torque Ave (Nm) | 14.464 | 21.357 | 9.266 |

500 hours @ 600° C. (tested at RT)

| SS/Al | Inst. | Break. | Prev. | PS/Al | Inst. | Break. | Prev. |
|---|---|---|---|---|---|---|---|
| 1 | 165 | 130 | 105 | 1 | 100 | 190 | 115 |
| 2 | 80 | 155 | 80 | 2 | 75 | 210 | 90 |
| 3 | 130 | 150 | 70 | 3 | 100 | 180 | 90 |
| 4 | 125 | 180 | 60 | 4 | 80 | 425 | 300 |
| 5 | 90 | 160 | 85 | 5 | 80 | 375 | 100 |
| Torque Ave (lbf-in) | 118.00 | 155.00 | 80.00 | Torque Ave (lbf-in) | 87.00 | 276.00 | 139.00 |
| Torque Ave (Nm) | 13.334 | 17.515 | 9.040 | Torque Ave (Nm) | 9.831 | 31.188 | 15.707 |

500 hours @ 600° C. (tested at RT)

| DP/Zn | Inst. | Break. | Prev. | Zn Flake/Zn | Inst. | Break. | Prev. |
|---|---|---|---|---|---|---|---|
| 1 | 110 | 425 | 275 | 1 | 165 | 400 | 175 |
| 2 | 70 | 375 | 200 | 2 | 60 | 475 | 150 |
| 3 | 80 | 375 | 150 | 3 | 120 | 425 | 125 |
| 4 | 95 | 500 | 600 | 4 | 55 | 400 | 125 |
| 5 | 70 | 375 | 425 | 5 | 100 | 400 | 125 |
| 6 | 90 | 400 | 150 | 6 | 105 | 350 | 125 |
| 7 | 90 | 400 | 125 | 7 | 70 | 425 | 125 |
| 8 | 130 | 350 | 125 | 8 | 75 | 375 | 100 |
| 9 | 40 | 450 | 450 | 9 | 110 | 300 | 125 |
| 10 | 70 | 475 | 100 | 10 | 120 | 600 | 250 |
| Torque Ave (lbf-in) | 84.50 | 412.50 | 260.00 | Torque Ave (lbf-in) | 98.00 | 415.00 | 142.50 |
| Torque Ave (Nm) | 9.549 | 46.613 | 29.380 | Torque Ave (Nm) | 11.074 | 46.895 | 16.103 |

Working Example 3

An adhesive composition is prepared and utilized to form an adhesive on a coated fastener. The adhesive composition is prepared in the same manner as Example 1, but a different grade of sodium silicate from PQ Corporation is utilized having a $SiO_2/Na_2O$ weight ratio of 2.88. Physical properties are illustrated in the tables below and determined according to the test methods above.

| Hot Strength @ 600° C. | | | | | | | |
|---|---|---|---|---|---|---|---|
| DP/Zn | Inst. | Break. | Prev. | Zn Flake/Zn | Inst. | Break. | Prev. |
| 1 | 90 | 400 | 100 | 1 | 125 | 400 | 125 |
| 2 | 85 | 325 | 50 | 2 | 80 | 275 | 75 |
| 3 | 50 | 400 | 100 | 3 | 130 | 275 | 125 |
| 4 | 95 | 350 | 75 | 4 | 80 | 300 | 350 |
| 5 | 50 | 350 | 100 | 5 | 115 | 350 | 100 |
| 6 | 135 | 275 | 100 | 6 | 110 | 275 | 75 |
| 7 | 65 | 350 | 100 | 7 | 70 | 300 | 75 |
| 8 | 90 | 300 | 100 | 8 | 65 | 275 | 100 |
| 9 | 75 | 275 | 75 | 9 | 100 | 375 | 125 |
| 10 | 110 | 250 | 100 | 10 | 140 | 125 | 100 |
| Torque Ave (lbf-in) | 84.50 | 327.50 | 90.00 | Torque Ave (lbf-in) | 101.50 | 295.00 | 125.00 |
| Torque Ave (Nm) | 9.549 | 37.008 | 10.170 | Torque Ave (Nm) | 11.470 | 33.335 | 14.125 |

| Hot Strength @ 250° C. | | | | | | | |
|---|---|---|---|---|---|---|---|
| DP/Zn | Inst. | Break. | Prev. | Zn Flake/Zn | Inst. | Break. | Prev. |
| 1 | 100 | 190 | 15 | 1 | 80 | 200 | 50 |
| 2 | 115 | 220 | 20 | 2 | 135 | 170 | 30 |
| 3 | 60 | 180 | 70 | 3 | 70 | 180 | 70 |
| 4 | 100 | 160 | 20 | 4 | 85 | 180 | 30 |
| 5 | 85 | 160 | 30 | 5 | 65 | 200 | 30 |
| 6 | 50 | 200 | 30 | 6 | 105 | 190 | 25 |
| 7 | 75 | 210 | 20 | 7 | 100 | 190 | 20 |
| 8 | 90 | 230 | 15 | 8 | 55 | 130 | 30 |
| 9 | 70 | 200 | 15 | 9 | 100 | 180 | 25 |
| 10 | 75 | 190 | 20 | 10 | 110 | 140 | 20 |
| Torque Ave (lbf-in) | 82.00 | 194.00 | 25.50 | Torque Ave (lbf-in) | 90.50 | 176.00 | 33.00 |
| Torque Ave (Nm) | 9.266 | 21.922 | 2.882 | Torque Ave (Nm) | 10.227 | 19.888 | 3.729 |

| Screening M8 Dry Phosphate Bolt with Aluminum Nut | | | | | | | |
|---|---|---|---|---|---|---|---|
| Sample | Inst. | Break. | Prev. | Sample | Inst. | Break. | Prev. |
| 400° C. Hot Strength | | | | 400° C. Heat Cure (2 hours at temp., RT break) | | | |
| 1 | 60 | 100 | 20 | 1 | 50 | 120 | 30 |
| 2 | 55 | 95 | 40 | 2 | 45 | 75 | 35 |
| 3 | 40 | 90 | 10 | 3 | 55 | 120 | 25 |
| Torque Ave (lbf-in) | 51.67 | 95.00 | 23.33 | Torque Ave (lbf-in) | 50.00 | 105.00 | 30.00 |
| Torque Ave (Nm) | 5.838 | 10.735 | 2.637 | Torque Ave (Nm) | 5.650 | 11.865 | 3.390 |
| 500° C. Hot Strength | | | | 500° C. Heat Cure (2 hours at temp., RT break) | | | |
| 1 | 45 | 100 | 40 | 1 | 50 | 75 | 20 |
| 2 | 45 | 90 | 45 | 2 | 55 | 85 | 20 |
| 3 | 40 | 100 | 60 | 3 | 35 | 70 | 20 |
| Torque Ave (lbf-in) | 43.33 | 96.67 | 48.33 | Torque Ave (lbf-in) | 46.67 | 76.67 | 20.00 |
| Torque Ave (Nm) | 4.897 | 10.923 | 5.462 | Torque Ave (Nm) | 5.273 | 8.663 | 2.260 |

Ambient Temperature Aging - Storage Stability
(Coated bolts aged for given time before assembly with nut,
assemblies then cured at 400° C. for 2 hours, followed by break at RT)

| DP/Zn | Inst. | Break. | Prev. | Zn Flake/Zn | Inst. | Break. | Prev. |
|---|---|---|---|---|---|---|---|
| 2 Week | | | | | | | |
| 1 | 80 | 300 | 75 | 1 | 70 | 275 | 75 |
| 2 | 100 | 225 | 75 | 2 | 70 | 225 | 75 |
| 3 | 80 | 250 | 50 | 3 | 80 | 200 | 50 |
| 4 | 70 | 250 | 50 | 4 | 130 | 200 | 50 |
| 5 | 100 | 250 | 75 | 5 | 90 | 200 | 50 |
| Torque Ave (lbf-in) | 86.00 | 255.00 | 65.00 | Torque Ave (lbf-in) | 88.00 | 220.00 | 60.00 |
| Torque Ave (Nm) | 9.718 | 28.815 | 7.345 | Torque Ave (Nm) | 9.944 | 24.860 | 6.780 |
| 1 Month | | | | | | | |
| 1 | 90 | 220 | 45 | 1 | 90 | 100 | 25 |
| 2 | 80 | 230 | 60 | 2 | 140 | 160 | 40 |
| 3 | 80 | 200 | 40 | 3 | 55 | 180 | 30 |
| 4 | 70 | 200 | 50 | 4 | 80 | 200 | 45 |
| Torque Ave (lbf-in) | 80.00 | 212.50 | 48.75 | Torque Ave (lbf-in) | 91.25 | 160.00 | 35.00 |
| Torque Ave (Nm) | 9.040 | 24.013 | 5.509 | Torque Ave (Nm) | 10.311 | 18.080 | 3.955 |
| 2 Month | | | | | | | |
| 1 | 90 | 225 | 50 | 1 | 60 | 200 | 30 |
| 2 | 85 | 250 | 25 | 2 | 90 | 175 | 40 |
| 3 | 65 | 225 | 50 | 3 | 60 | 150 | 30 |
| 4 | 110 | 250 | 50 | 4 | 60 | 150 | 30 |
| Torque Ave (lbf-in) | 87.50 | 237.50 | 43.75 | Torque Ave (lbf-in) | 67.50 | 168.75 | 32.50 |
| Torque Ave (Nm) | 9.888 | 26.838 | 4.944 | Torque Ave (Nm) | 7.628 | 19.069 | 3.673 |

| DP/Zn | Inst. | Break. | Prev. | DP/Zn | Inst. | Break. | Prev. |
|---|---|---|---|---|---|---|---|
| 3 Month | | | | 4 Month | | | |
| 1 | 60 | 200 | N/A | 1 | 120 | 200 | 30 |
| 2 | 70 | 175 | N/A | 2 | 50 | 200 | 35 |
| 3 | 90 | 225 | N/A | Torque Ave (lbf-in) | 85.00 | 200.00 | 32.50 |
| Torque Ave (lbf-in) | 73.33 | 200.00 | N/A | Torque Ave (Nm) | 9.605 | 22.600 | 3.673 |
| Torque Ave (Nm) | 8.287 | 22.600 | N/A | | | | |
| 5 Month | | | | 6 Month | | | |
| 1 | 100 | 275 | 50 | 1 | 120 | 175 | 50 |
| 2 | 95 | 225 | 50 | 2 | 150 | 275 | 100 |
| Torque Ave (lbf-in) | 97.50 | 250.00 | 50.00 | Torque Ave (lbf-in) | 135.00 | 225.00 | 75.00 |
| Torque Ave (Nm) | 11.018 | 28.250 | 5.650 | Torque Ave (Nm) | 15.255 | 25.425 | 8.475 |
| 7 Month | | | | 8 Month | | | |
| 1 | 185 | 125 | 70 | 1 | 150 | 90 | 70 |
| 2 | 120 | 225 | 125 | 2 | 150 | 145 | 95 |
| Torque Ave (lbf-in) | 152.50 | 175.00 | 97.50 | Torque Ave (lbf-in) | 150.00 | 117.50 | 82.50 |
| Torque Ave (Nm) | 17.233 | 19.775 | 11.018 | Torque Ave (Nm) | 16.950 | 13.278 | 9.323 |
| 9 Month | | | | 10 Month | | | |
| 1 | — | — | — | 1 | 175 | 240 | 75 |
| 2 | — | — | — | 2 | 120 | 60 | 45 |
| 3 | — | — | — | 3 | 105 | 50 | 25 |
| Torque Ave (lbf-in) | NA | NA | NA | Torque Ave (lbf-in) | 133.33 | 116.67 | 48.33 |
| Torque Ave (Nm) | NA | NA | NA | Torque Ave (Nm) | 15.067 | 13.183 | 5.462 |
| 11 Month | | | | 12 Month | | | |
| 1 | 160 | 75 | 50 | 1 | 80 | 15 | 15 |
| 2 | 90 | 65 | 50 | 2 | 160 | 160 | 60 |
| 3 | 85 | 25 | 25 | 3 | 180 | 210 | 85 |

| Ambient Temperature Aging - Storage Stability (Coated bolts aged for given time before assembly with nut, assemblies then cured at 400° C. for 2 hours, followed by break at RT) | | | | | | | |
|---|---|---|---|---|---|---|---|
| Torque Ave (lbf-in) | 87.50 | 45.00 | 37.50 | 4 | 120 | 130 | 65 |
| Torque Ave (Nm) | 9.888 | 5.085 | 4.238 | Torque Ave (lbf-in) | 150.00 | 170.00 | 75.00 |
| | | | | Torque Ave (Nm) | 16.950 | 19.210 | 8.475 |

Working Example 4

An adhesive composition is prepared and utilized to form an adhesive on a coated fastener. The adhesive composition and coated fastener is prepared in the same manner as Example 1, except the adhesive composition comprises 84 parts of a 25% sodium silicate in water solution, 12 parts of a 30% hydrocarbon wax dispersion in water, 0.8 parts titanium dioxide powder, 0.8 parts untreated fumed silica, 1.3 parts of ethoxylated 2,4,7,9-tetramethyl 5 decyn-4,7-diol, and 1 part aluminum trihydrate. The sodium silicate is the same grade as in Working Example 3, and commercially available from PQ Corporation.

Physical properties are illustrated in the tables below and determined according to the test methods above. Working Example 4 shows a vastly increased on part shelf life stability when using additive levels of aluminum trihydrate relative to Working Example 3.

| Screening M8 Dry Phosphate Bolt with Aluminum Nut | | | | | | | |
|---|---|---|---|---|---|---|---|
| Sample | Inst. | Break. | Prev. | Sample | Inst. | Break. | Prev. |
| 400° C. Hot Strength | | | | 400° C. Heat Cure (2 hours at temp., RT break) | | | |
| 1 | 45 | 110 | 65 | 1 | 30 | 90 | 20 |
| 2 | 45 | 70 | 10 | 2 | 55 | 60 | 20 |
| 3 | 45 | 85 | 30 | 3 | 45 | 80 | 20 |
| Torque Ave (lbf-in) | 45.00 | 88.33 | 35.00 | Torque Ave (lbf-in) | 43.33 | 76.67 | 20.00 |
| Torque Ave (Nm) | 5.085 | 9.982 | 3.955 | Torque Ave (Nm) | 4.897 | 8.663 | 2.260 |
| 500° C. Hot Strength | | | | 500° C. Heat Cure (2 hours at temp., RT break) | | | |
| 1 | 50 | 100 | 40 | 1 | 55 | 65 | 20 |
| 2 | 50 | 100 | 30 | 2 | 45 | 75 | 15 |
| 3 | 40 | 120 | 40 | 3 | 40 | 75 | 20 |
| Torque Ave (lbf-in) | 46.67 | 106.67 | 36.67 | Torque Ave (lbf-in) | 46.67 | 71.67 | 18.33 |
| Torque Ave (Nm) | 5.273 | 12.053 | 4.143 | Torque Ave (Nm) | 5.273 | 8.098 | 2.072 |

| Ambient Temperature Aging - Storage Stability (Coated bolts aged for given time before assembly with nut, assemblies then cured at 400° C. for 2 hours, followed by break at RT) M10 Dry Phosphate Bolt with Zinc Nut | | | | | | | |
|---|---|---|---|---|---|---|---|
| Sample | Inst. | Break. | Prev. | Sample | Inst. | Break. | Prev. |
| 2 Week | | | | 1 Month | | | |
| 1 | 90 | 250 | 75 | 1 | 60 | 220 | 45 |
| 2 | 90 | 225 | 50 | 2 | 60 | 230 | 60 |
| 3 | 50 | 220 | 50 | 3 | 75 | 200 | 40 |
| 4 | 80 | 200 | 60 | Torque Ave (lbf-in) | 65.00 | 216.67 | 48.33 |
| 5 | 80 | 190 | 30 | Torque Ave (Nm) | 7.345 | 24.483 | 5.462 |
| Torque Ave (lbf-in) | 78.00 | 217.00 | 53.00 | | | | |
| Torque Ave (Nm) | 8.814 | 24.521 | 5.989 | | | | |

-continued

Ambient Temperature Aging - Storage Stability
(Coated bolts aged for given time before assembly with nut,
assemblies then cured at 400° C. for 2 hours, followed by break at RT)
M10 Dry Phosphate Bolt with Zinc Nut

| Sample | Inst. | Break. | Prev. | Sample | Inst. | Break. | Prev. |
|---|---|---|---|---|---|---|---|
| 2 Month | | | | 3 Month | | | |
| 1 | 60 | 210 | 35 | 1 | 110 | 250 | 25 |
| 2 | 140 | 210 | 30 | 2 | 165 | 240 | 40 |
| 3 | 45 | 180 | 40 | 3 | 130 | 220 | 50 |
| Torque Ave (lbf-in) | 81.67 | 200.00 | 35.00 | Torque Ave (lbf-in) | 135.00 | 236.67 | 38.33 |
| Torque Ave (Nm) | 9.228 | 22.600 | 3.955 | Torque Ave (Nm) | 15.255 | 26.743 | 4.332 |
| 4 Month | | | | 5 Month | | | |
| 1 | 120 | 260 | 30 | 1 | 240 | 375 | 50 |
| 2 | 150 | 260 | 80 | 2 | 190 | 325 | 50 |
| Torque Ave (lbf-in) | 135.00 | 260.00 | 55.00 | Torque Ave (lbf-in) | 215.00 | 350.00 | 50.00 |
| Torque Ave (Nm) | 15.255 | 29.380 | 6.215 | Torque Ave (Nm) | 24.295 | 39.550 | 5.650 |
| 6 Month | | | | 7 Month | | | |
| 1 | 250 | 300 | 95 | 1 | 185 | 400 | 125 |
| 2 | 250 | 400 | 75 | 2 | 195 | 400 | 125 |
| 3 | 195 | 350 | 125 | 3 | — | — | — |
| Torque Ave (lbf-in) | 231.67 | 350.00 | 98.33 | Torque Ave (lbf-in) | 190.00 | 400.00 | 125.00 |
| Torque Ave (Nm) | 26.178 | 39.550 | 11.112 | Torque Ave (Nm) | 21.470 | 45.200 | 14.125 |
| 9 Month | | | | 10 Month | | | |
| 1 | 185 | 425 | 150 | 1 | 175 | 450 | 75 |
| 2 | 160 | 425 | 150 | 2 | 240 | 450 | 175 |
| 3 | 160 | 375 | 75 | 3 | 145 | 400 | 100 |
| Torque Ave (lbf-in) | 168.33 | 408.33 | 125.00 | Torque Ave (lbf-in) | 186.67 | 433.33 | 116.67 |
| Torque Ave (Nm) | 19.022 | 46.142 | 14.125 | Torque Ave (Nm) | 21.093 | 48.967 | 13.183 |
| 12 Month | | | | | | | |
| 1 | 170 | 425 | 75 | | | | |
| 2 | 195 | 75 | 25 | | | | |
| 3 | 105 | 375 | 125 | | | | |
| 4 | 170 | 300 | 75 | | | | |
| 5 | 185 | 425 | 125 | | | | |
| 6 | 95 | 375 | 100 | | | | |
| Torque Ave (lbf-in) | 153.33 | 329.17 | 87.50 | | | | |
| Torque Ave (Nm) | 17.327 | 37.196 | 9.888 | | | | |

Accelerated Aging at 70° C.
(Cured at 400° C. for 2 hours, RT break)
M10 Dry Phosphate Bolt with Zinc Nut

| Storage Time | Inst. | Break. | Prev. |
|---|---|---|---|
| 4 Day | 130 | 350 | 225 |
| 7 Day | 90 | 300 | 290 |
| 12 Day | 90 | 300 | 275 |
| 14 Day | 100 | 325 | 300 |
| 19 Day | 130 | 350 | 250 |
| 21 Day | 160 | 350 | 275 |
| 28 Day | 130 | 425 | 175 |
| 35 Day | 150 | 400 | 175 |
| 42 Day | 170 | 425 | 275 |
| 49 Day | 80 | 325 | 175 |
| 56 Day | 160 | 400 | 300 |
| 63 Day | 120 | 350 | 150 |
| 70 Day | 190 | 400 | 275 |
| 84 Day | 150 | 375 | 200 |
| Torque Ave (lbf-in) | 132.14 | 362.50 | 238.57 |
| Torque Ave (Nm) | 14.932 | 40.963 | 26.959 |

Additional Examples

Additional examples are formulated as described immediately below.

Example 5

An adhesive composition is prepared and utilized to form an adhesive on a coated fastener. The adhesive composition is prepared in the same manner as Example 1, but sodium aluminate is used in place of sodium silicate. Suitable sodium aluminate is commercially available from Sigma-Aldrich.

Example 6

An adhesive composition is prepared and utilized to form an adhesive on a coated fastener. The adhesive composition is prepared in the same manner as Example 2, but sodium aluminate is used in place of sodium silicate. Suitable sodium aluminate is commercially available from Sigma-Aldrich.

Examples 7a and 7b

An adhesive composition is prepared and utilized to form an adhesive on a coated fastener. The adhesive composition is prepared in the same manner as Examples 1 and 2, but lithium silicate is used in place of sodium silicate, respectively for Example "a" and "b". Suitable lithium silicate is commercially available from Sigma-Aldrich.

Examples 8a and 8b

An adhesive composition is prepared and utilized to form an adhesive on a coated fastener. The adhesive composition is prepared in the same manner as Examples 1 and 2, but lithium aluminate is used in place of sodium silicate, respectively for Example "a" and "b". Suitable lithium aluminate is commercially available from Sigma-Aldrich.

Examples 9a and 9b

An adhesive composition is prepared and utilized to form an adhesive on a coated fastener. The adhesive composition is prepared in the same manner as Example 2, but potassium silicate is used in place of sodium silicate, respectively for Example "a" and "b". Suitable potassium silicate is commercially available from Sigma-Aldrich.

Examples 10a and 10b

An adhesive composition is prepared and utilized to form an adhesive on a coated fastener. The adhesive composition is prepared in the same manner as Example 2, but potassium aluminate is used in place of sodium silicate, respectively for Example "a" and "b". Suitable potassium aluminate is commercially available from Sigma-Aldrich.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A fastener comprising:
   a threaded surface;
   an adhesive composition at least partially disposed on said threaded surface; and
   a top coat composition different from and at least partially disposed over said adhesive composition opposite said threaded surface;
   wherein said adhesive composition includes an inorganic compound comprising;
   i) at least one Group 1 metal, and
   ii) at least one Group 13 element and/or Group 14 element; and
   wherein said inorganic compound is present in an amount of at least about 20 parts by weight based on 100 parts by weight of said adhesive composition.

2. The fastener as set forth in claim 1, wherein said inorganic compound is present in an amount of from about 25 to 100 parts by weight based on 100 parts by weight of said adhesive composition.

3. The fastener as set forth in claim 1, wherein said Group 1 metal is selected from the group consisting of lithium (Li), sodium (Na), potassium (K), rubidium (Rb), cesium (Cs), francium (Fr), and combinations thereof.

4. The fastener as set forth in claim 3, wherein said Group 1 metal is Na.

5. The fastener as set forth in claim 1, wherein said inorganic compound comprises said at least one Group 13 element and wherein said Group 13 element is selected from the group consisting of boron (B), aluminum (Al), gallium (Ga), indium (In), thallium (Tl), ununtrium (Uut), and combinations thereof.

6. The fastener as set forth in claim 5, wherein said Group 13 element is Al.

7. The fastener as set forth in claim 1, wherein said inorganic compound comprises said at least one Group 14 element and wherein said Group 14 element is selected from the group consisting of carbon (C), silicon (Si), germanium (Ge), tin (Sn), lead (Pb), flerovium (Fl), and combinations thereof.

8. The fastener as set forth in claim 7, wherein said Group 14 element is Si.

9. The fastener as set forth in claim 1, wherein said inorganic compound is selected from the group consisting of lithium silicate, sodium silicate, potassium silicate, lithium aluminate, sodium aluminate, potassium aluminate, and combinations thereof.

10. The fastener as set forth in claim 9, wherein said inorganic compound is sodium silicate.

11. The fastener as set forth in claim 9, wherein said inorganic compound is sodium aluminate.

12. The fastener as set forth in claim 1, wherein said adhesive composition further comprises at least one additive selected from the group consisting of surfactants, waxes, fillers, impact modifiers, expansion agents, binders, and combinations thereof, and wherein said at least one additive is present in an amount of from about 1 to about 75 part(s) by weight based on 100 parts by weight of said adhesive composition.

13. The fastener as set forth in claim 12, wherein said adhesive composition further comprises at least one of alumina trihydrate, an acrylic resin, or a combination thereof.

14. The fastener as set forth in claim 1, wherein said top coat composition comprises a resinous binder, alternatively comprises an acrylic resin, and wherein said top coat composition is present in an amount of from about 5 to less than 50 parts by weight based on 100 parts by weight of said adhesive composition and said top coat composition combined.

15. The fastener as set forth in claim 1, wherein said fastener is selected from the group consisting of bolts, nuts, screws, studs, stand-offs, and combinations thereof.

* * * * *